O. I. JUDELSHON.
PROTECTOR FOR TRANSMITTING MECHANISM.
APPLICATION FILED SEPT. 25, 1917.
1,326,202.
Patented Dec. 30, 1919.
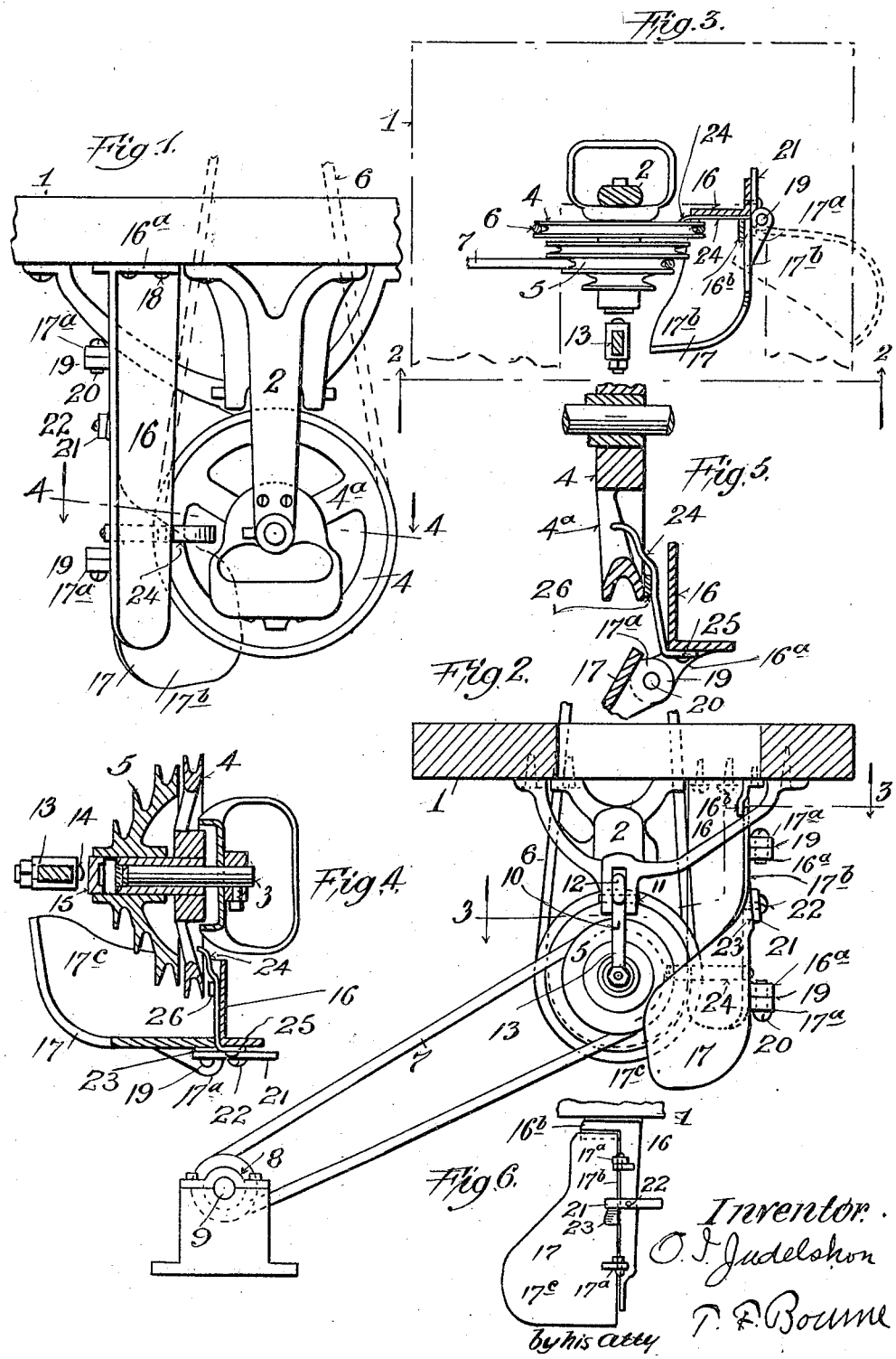

UNITED STATES PATENT OFFICE.

OSCAR I. JUDELSHON, OF NEW YORK, N. Y.

PROTECTOR FOR TRANSMITTING MECHANISM.

1,326,202.   Specification of Letters Patent.   Patented Dec. 30, 1919.

Application filed September 25, 1917. Serial No. 193,061.

*To all whom it may concern:*

Be it known that I, OSCAR I. JUDELSHON, a citizen of the United States, and resident of New York city, borough of Manhattan, in the county of New York and State of New York, have invented certain new and useful Improvements in Protectors for Transmitting Mechanism, of which the following is a specification.

The object of my invention is to provide a protector or guard for transmitting mechanism, such as pulleys, to protect operatives from the pulleys and belts running thereon, which protector or guard may be moved from said mechanism to permit access thereto, as for adjusting the belt or belts thereon. A further object of my invention is to provide means to indicate if the protector has been left moved away from its guarding position over the mechanism, whereby to cause an operative to restore the protector to its proper position for protecting or guarding the mechanism.

I have illustrated by improvements in connection with transmitting pulleys adapted for the operation of a sewing machine, and in the example shown I provide a support or hanger adapted to be secured adjacent to the pulleys and a protector pivotally carried by said support adapted to be swung to a closed or protecting position in front of the pulleys to guard the operative from the pulleys, and adapted to be swung away from the pulleys to permit access thereto for adjusting the belt or belts thereon. I have also illustrated an indicator or signaling device, which is shown comprising a spring-acting member adapted to engage one of the pulleys when the protector is swung open, to indicate audibly or by means of a brake bearing on the pulley, or both, that the protector has been left open, and so arranged that when the protector is closed in front of the pulleys said indicator will be non-operative.

My invention also comprises novel details of improvement and combinations of parts that will be more fully hereinafter set forth and then pointed out in the claims.

Reference is to be had to the accompanying drawings forming part hereof, wherein, Figure 1 is a side view illustrating my improvements applied in connection with transmssion pulleys hung from a table, Fig. 2 is a similar view looking from the opposite side of Fig. 1; Fig. 3 is a plan view partly in section substantially on the plane of the line 3, 3, in Fig. 2; Fig. 4 is a section substantially on the line 4, 4, in Fig. 1; Fig. 5 is an enlarged sectional detail illustrating the protector open and the indicator in operative position with relation to a pulley, and Fig. 6 is a side view of the protector looking from the left in Fig. 1.

Similar numerals of reference indicate corresponding parts in the several views.

The numeral 1 indicates a portion of a table, such as a table adapted to support a sewing machine in any well known manner. I have illustrated a transmitting mechanism in the form of pulleys suspended from the table, and comprising a hanger or bracket 2 having a shaft or spindle 3, upon which a transmitting pulley 4 is loosely mounted, and at 5 is a stepped or cone pulley also loosely supported on shaft or spindle 3 at one side of pulley 4 to be moved into engagement with the latter to cause rotation thereof. A belt 6 passing from pulley 4 is adapted to drive a sewing machine (not shown) in a well known manner, and a drive belt 7 passes over either of the steps of pulley 5 from a driving pulley 8 on a drive shaft 9 rotative in any suitable manner. A lever 10 pivoted at 11 and having an arm 12 for operating it, is located in position so that its depending arm 13 may be pushed toward the cone pulley whereby a stop 14 on the arm 13 may engage the cap 15 at the end of pulley 5 to push the latter toward pulley 4 when it is desired to cause operation of the latter. The parts above described are of a well known type of pulley transmission mechanism, utilized for driving sewing machines in factories from a constantly driven power shaft 9, and are illustrated in the accompanying drawings for the purpose of showing my improvements in connection with a suitable transmission mechanism against which the operative is to be protected.

Adjacent to the aforesaid pulleys is my improved protector or guard which, as illustrated in the accompanying drawings, comprises a support or hanger 16 to be secured to the table, and a movable or hinged protector or guard 17 carried by said support. The support 16 is shown in angular form for strength and lightness, and provided with a web 16ᵃ adapted to receive screws 18 for securing the support to the table, from which the support depends. The protector or guard 17 is hinged along one vertical edge, as by the hinges 19, to the support 16, whereby said protector may be swung in position in front of the pulleys, as in Figs. 1, 2, 3 and 4, and may be swung away from the pulleys as in dotted lines in Fig. 3 and in Fig. 5. Said hinges 19 may be formed by means of lugs 16<sup>a</sup> cast integral with the support 16 and complemental lugs 17<sup>a</sup> cast integral with the protector or guard 17, the lugs receiving screws or the like 20. The support 16 is shown provided with a stop, such as a depending web 16<sup>b</sup> (Figs. 1 and 2) against which the upper end of the protector 17 may bear to limit closing of the latter toward the pulleys. Said protector or guard 17 is shown having vertically disposed wall portion 17<sup>b</sup>, one edge of which is hinged to the support 16, and having a lower portion 17<sup>c</sup>, which is curved and in hollow form to fit in front of and pass partly under the pulleys when the protector is swung to the closed position. The protector thus is so shaped as to keep the clothes and limbs of the operative out of contact with the pulleys, and yet the protector may be swung away from the pulleys to permit free access to the latter, whereby the belts may be adjusted when required. I provide means to retain the protector 17 closed in front of the pulleys, for which purpose I have shown a latch 21 pivoted at 22, upon support 16 and adapted to be swung crosswise behind member 17 to prevent the latter from swinging open (Fig. 6), whereby when said latch is swung away from protector 17, such as parallel to support 16, said protector may be swung open. By preference latch 21 bears against a downwardly inclined portion 23 which may be cast upon the surface of protector 17, whereby, by reason of jarring or vibration of the mechanism, said latch will be caused to firmly seat itself in front of the protector 17.

Many operatives are known to be careless, and might be liable to leave the protector 17 swung away from its protecting position in front of the pulleys, after making an adjustment of a belt on a pulley. I, therefore, provide means tending to cause the operative to close the protector in front of the pulleys after he has swung the protector away therefrom. For such purpose I have illustrated a spring member 24, which is shown secured at 25 to support 16, as by a rivet or screw, and extends thence to a position adapted to engage the spokes 4<sup>a</sup> of pulley 4, when protector 17 is open. Said spring member thus becomes an indicator because the spokes of pulley 4 when rotating will snap past said indicator or spring and will produce an audible signal. The indicator 24 is located in such a position that when protector 17 is closed in front of the pulleys, the protector will engage the indicator and press it back out of operative relation with the spokes of pulley 4, as indicated in Fig. 4, so that no signal will then be given and the pulley will be free to operate noiselessly as usual. Furthermore, in case the operative should disregard the noise made by the indicator 24 when the spokes of the pulley snap past the same, I provide braking means for said pulley controlled by protector 17, to indicate to the operative by reason of the slow speed of the sewing machine that the protector is open. Such brake may comprise a suitable brake member 26, such as a piece of leather riveted or otherwise secured to the spring member 24, said brake member 26 being in position to engage the rim of pulley 4 when the protector 17 is open, as illustrated in Fig. 5. When the protector 17 is closed the brake member 26 will be moved backwardly from pulley 4, by reason of the engagement of such protector with the spring member 24, and then the pulley 4 will be free to rotate (see Fig. 4).

It will be understood that my improvements may be applied in connection with mechanism other than the particular arrangements of pulleys set forth, for the purpose of protecting operatives against such mechanism and yet permitting ready access thereto. Also, that while I have illustrated a particular construction and arrangement of parts embodying my improvements, the same may be varied, within the scope of the appended claims, without departing from the spirit of my invention.

Having now described my invention what I claim is:—

1. A device of the class described comprising a support adapted to be secured adjacent to mechanism, a protector movably carried thereby adapted to be moved in front of said mechanism to protect the latter, means to retain said protector in the last named position and an indicator supported adjacent to said mechanism and coöperative with said mechanism to give a signal when the protector is open, said protector coöperating with said indicator to retain it out of coöperation with said mechanism when the protector is closed.

2. A device of the class described comprising a support, means to suspend the support from a table adjacent to mechanism to be protected, a protector hinged along an edge of said support adapted to be swung in front of said mechanism and away therefrom, means to retain the protector over the mechanism and an indicator supported adjacent to said mechanism and coöperative with said mechanism to give a signal when the protector is open, said protector coöperating with said indicator to retain it out of coöperation with said mechanism when the protector is closed.

3. A device of the class described comprising a support adapted to be secured adjacent to mechanism, a protector movably carried thereby adapted to be moved in front of said mechanism to protect the latter, means to retain said protector in the last named position, and an indicator carried by said support to coöperate with said mechanism to give a signal when the protector is open, said indicator being in position to be retained out of coöperation with the mechanism when the protector is closed.

4. A device of the class described comprising a support adapted to be secured adjacent to mechanism, a protector movably carried thereby adapted to be moved in front of said mechanism to protect the latter, means to retain said protector in the last named position, and a spring-member carried by said support adapted to coöperate with said mechanism to give a signal, said member being located in position to be retained by said protector out of coöperation with the mechanism when the protector is closed.

5. A device of the class described comprising a support adapted to be secured adjacent to mechanism, a protector movably carried thereby adapted to be moved in front of said mechanism to protect the latter, means to retain said protector in the last named position, a brake member to coöperate with a wheel of said mechanism, and a spring connected with said brake member and carried by said support, said spring being in position to retain the brake member out of coöperation with the wheel when the protector is closed.

6. A device of the class described comprising a support adapted to be secured adjacent to mechanism, a protector movably carried thereby adapted to be moved in front of said mechanism to protect the latter, means to retain said protector in the last named position, a spring member carried by said support and having a portion located between the support and said protector to be moved by the latter when the protector is closed, in combination with a wheel journaled adjacent to such protector and spring, said spring being in position to engage the wheel to give an alarm when the protector is open, said protector retaining said spring out of coöperation with the wheel when the protector is closed.

Signed at New York city, in the county of New York and State of New York this 24th day of September A. D. 1917.

OSCAR I. JUDELSHON.